(12) United States Patent
Fransen et al.

(10) Patent No.: US 9,779,409 B2
(45) Date of Patent: Oct. 3, 2017

(54) TRACKING AND LINKING MOBILE DEVICE ACTIVITY

(71) Applicant: Adobe Systems Incorporated, San Jose, CA (US)

(72) Inventors: Peter R. Fransen, Lehi, UT (US); Jonathan R. Gale, Orem, UT (US); Andrew H. VanWagoner, Lehi, UT (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 266 days.

(21) Appl. No.: 14/316,340

(22) Filed: Jun. 26, 2014

(65) Prior Publication Data

US 2015/0379526 A1    Dec. 31, 2015

(51) Int. Cl.
*G06F 19/00* (2011.01)
*G06Q 30/02* (2012.01)

(52) U.S. Cl.
CPC ..... *G06Q 30/0201* (2013.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 2002/0065781 A1* | 5/2002 | Hillegass | ............... | G06F 21/10 705/59 |
| 2005/0102240 A1* | 5/2005 | Misra | ............... | G06Q 30/06 705/59 |
| 2007/0226019 A1* | 9/2007 | Carlson | ............... | G06Q 50/12 705/5 |
| 2014/0014720 A1* | 1/2014 | Sarkis, Jr. | ............... | G06Q 50/22 235/382 |

* cited by examiner

*Primary Examiner* — Michael G Lee
*Assistant Examiner* — Tabitha Chedekel
(74) *Attorney, Agent, or Firm* — Keller Jolley Preece

(57) ABSTRACT

Methods for tracking mobile devices with increased accuracy include generating a first time-dependent identifier. Generating the first time-dependent identifier includes device information, location information, and time information identified for the device and for a request by the device to visit a third-party content supplier in association with a redirection instruction. One or more embodiments monitor additional activity by a plurality of client devices for a second time-dependent identifier. Because both identifiers are time dependent, if the identifiers match, one or more embodiments can determine that the client device has performed an action at the third-party content supplier in association with the redirection instruction with an improved probability of accuracy.

20 Claims, 7 Drawing Sheets

TRACKING AND LINKING MOBILE DEVICE ACTIVITY

CROSS REFERENCE TO RELATED APPLICATIONS

N/A.

BACKGROUND

1. Technical Field

One or more embodiments relate generally to systems and methods for tracking user devices. More specifically, one or more embodiments relate to systems and methods of tracking a mobile user device and linking activities to the mobile user device.

2. Background and Relevant Art

Analytics companies track user interactions to generate analytics reports. Analytics reports detail user interactions with advertisements, user visits to websites, user purchases, and other interactions. The data gathered by analytics reports can provide valuable insights. For example, analytic reports can help entities learn which advertising campaigns are successful and which campaigns are not successful. Analytic reports can also help entities learn where and when advertising can be most effective for converting potential customers into customers.

In order to conduct mobile device campaign tracking, advertisers need a way to uniquely identify mobile users on a given device. Conventionally, analytics companies track mobile devices using the media access control (MAC) address or the unique identifier (UDID). Recently, however, tracking mobile devices has become challenging due to privacy laws or other restrictions placed on the collection of customer data. For example, some countries limit the amount of location information that can be used in tracking device information. In another example, some content hosting services (e.g., some application stores) prevent the use of certain device identifiers such as the MAC address or the UDID.

Tracking mobile devices can become particularly difficult when attempting to link activities that occur through a third-party content supplier (such as for example, an application store). In particular, many third-party application stores will not allow cookie-based tracking. Thus, when a user of a mobile device follows a link to a mobile application store for downloading an application, conventional analytics systems may be unable to directly determine when or if the user downloaded the application.

These and other disadvantages may exist with respect to conventional mobile tracking techniques.

SUMMARY

One or more embodiments provide benefits and/or solve one or more of the foregoing or other problems in the art with systems and methods for tracking user devices. For example, one or more embodiments involve tracking mobile devices when no truly unique identifier exists between an initial user interaction and a subsequent user interaction. Specifically, one or more embodiments generate a time-dependent identifier for a client device based on an initial user interaction. The time-dependent identifier allows a tracking system to determine, with a particular likelihood, that a client device performing a subsequent user interaction is the same device that performed the initial user interaction.

In one or more embodiments the time-dependent identifier can comprise a combination of device fingerprinting and time stamping. The time-dependent identifier can provide an accurate method of tracking the client device without using certain unique identifiers that may violate the terms of service for third-party content suppliers. At the same time the use of the time-dependent identifier can also allow for accurate mobile device tracking without collecting or using information prohibited by privacy laws.

Additional features and advantages of one or more embodiments of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features of the invention may be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
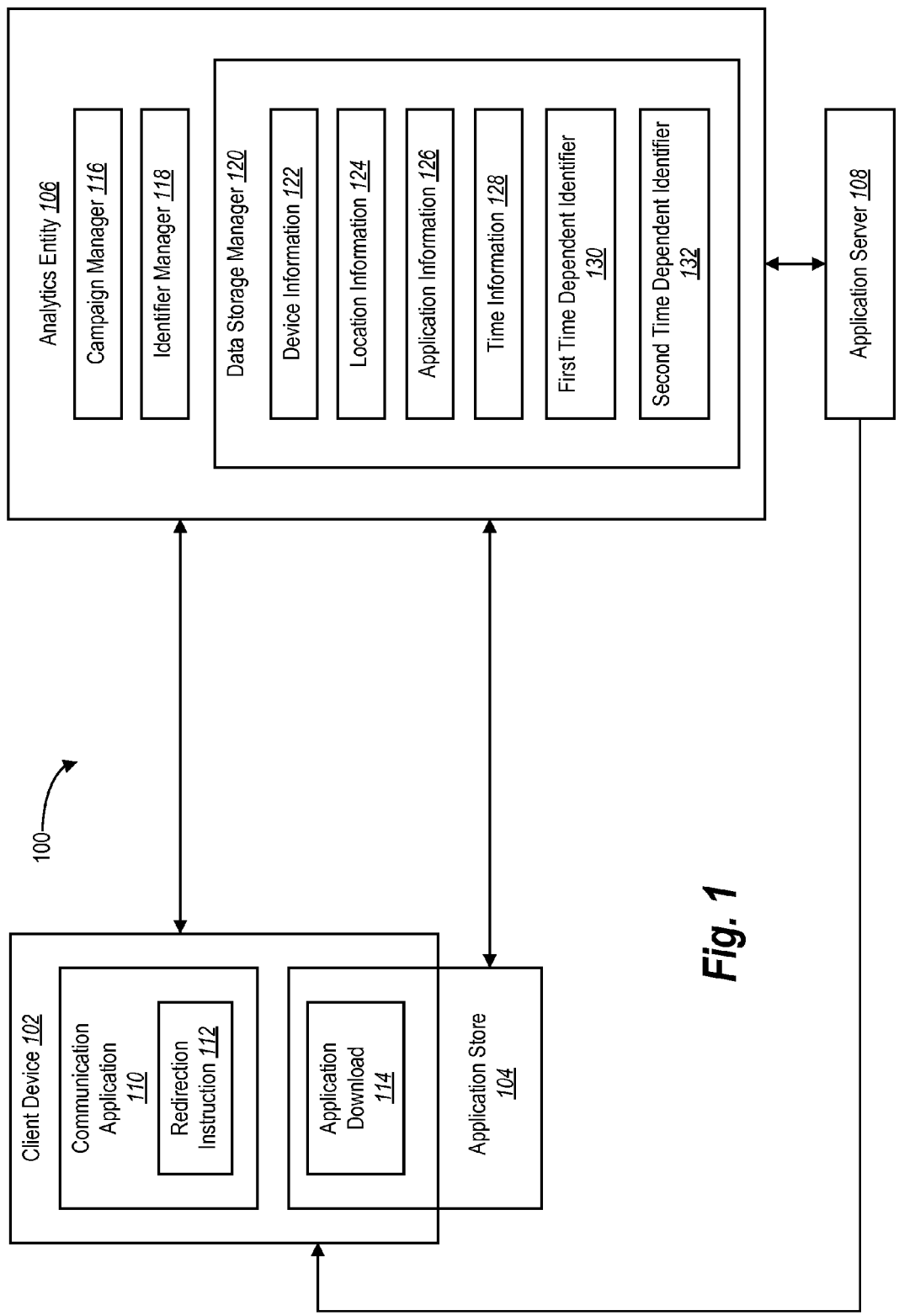
FIG. 1 illustrates a schematic diagram of a device tracking system in accordance with one or more embodiments.

One or more embodiments include a device tracking system that track events performed by, or otherwise associated with, mobile devices. The device tracking system can determine, with a particular likelihood, that a client device performing a subsequent user interaction is the same device that performed a previous initial user interaction. The tracking system can then associate the subsequent user interaction with the initial user action to aid in campaign tracking.

In particular, the device tracking system can detect an initial event performed by a client device, such as for example, a request from the client device to visit a third-party content supplier in association with a redirection instruction to download an application. In response to the initial event, the device tracking system can identify information associated with the initial event (e.g., device information, location information, and time information). Based on the identified information, the device tracking system can generate an identifier. The device tracking system can monitor subsequent events, such as for example, launching of an application associated with the campaign. For each subsequent event, the device tracking system can generate an identifier as described above. Then if an identifier associated with a subsequent event corresponds with the identifier from the initial event performed by the client device, the tracking system can associated the particular subsequent event with the initial event performed by the client device for the purpose of campaign tracking.

The identifiers can comprise a combination of device fingerprinting and time stamping. The identifiers can provide an accurate method of tracking the client device without using certain unique identifiers that may violate the terms of service for third-party content suppliers. At the same time the use of the identifiers can also allow for accurate mobile device tracking without collecting or using information prohibited by privacy laws.

In one or more embodiments, some or all of the device information or the location information upon which the identifiers are generated can be non-unique information that can identify more than one device. Because some or all of the information can be non-unique information, the device tracking system can also base the identifiers off of time information to more accurately link initial and subsequent events. In particular, the device tracking system can use a time or range of times in which the identifier is valid for the corresponding device. To illustrate, the device tracking system can determine with a certain degree of confidence, based on a valid time window for the time-dependent identifier, that the particular mobile device follows a redirection instruction to download a particular application at a third-party application store and launches the particular application.

Additionally, the device tracking system can place the time-dependent identifier into one or more groups based on the time information. Specifically, the device tracking system can expand the time window by grouping time-dependent identifiers into groups based one or more digits in the time value or truncated time value. Grouping the time-dependent identifiers based on the time information can allow the device tracking system to customize the valid time window for matching identifiers.

According to one or more embodiments, the device tracking system can also generate a hash value of the information describing the request and/or device to generate the time-dependent identifier. In particular, the device tracking system can combine the device information, location information, time information, and other information associated with the request to create a "most unique" hash value. Because the information associated with the request and/or device may not include completely unique information due to privacy laws and/or other limitations, generating a hash value that expires or becomes invalid after a certain amount of time can reduce the probability of false positive identifications and missed identifications of client devices in association with an event.

As used herein, the term "redirection instruction" refers to any link or redirection code in a website or application. In particular, a "redirection instruction" can include a link, instruction or code to direct or redirect a client device from the website or application to a third-party content supplier or application. For example, the "redirection instruction" can be associated with an advertisement for a source external to the website or application in which the advertisement is presented. In another example, the "redirection instruction" can be an advertisement or a link to an application store to download a particular application (e.g., a mobile application).

As used herein, the terms "third-party content supplier" and "third-party application store" refer to any third-party application or website. In particular, a "third-party content supplier" can include an application or website that is third-party to an application or website from which a client device accesses a redirection instruction. For example, the "third-party content supplier" can be an application store for purchasing and/or downloading mobile applications, content, or updates for use on a mobile device or other client device.

As used herein, the term "time-dependent identifier" refers to an identifier that based on device fingerprinting and time stamping or bucketing. In particular, a "time-dependent identifier" includes information describing a client device at a time the client device performs an event related to a campaign. For example, a "time-dependent identifier" can comprise a concatenated string including device information, location information, and time information. In one or more embodiments the time information can comprise a time bucket or a window of time. Furthermore, in one or more embodiments the time-dependent identifier can comprise a hash of the device information, location information, and time information.

As used herein, the term "device information" refers to any piece of information that can indicate one or more characteristics of a client device. Specifically, the device information can describe certain identifying aspects of the client device. For example, device information can describe the type of client device, including manufacturer of the client device, a model of the client device, a version of the device, and/or other information that may identify a characteristic of a device. Device information may also include information describing an operating system running on the device, including a version of the operating system.

As used herein, the term "location information" refers to any piece of information that can indicate a location of a mobile device. Specifically, location information can describe a location of the client device at the time of an event related to a campaign. For example, in one or more embodiments location information comprises at least a partial IP address of the client device when the client device, GPS location information, cellular tower triangulation information, or other information that indicates a location of the client device.

The methods and systems disclosed herein can provide improvements in device tracking by increasing the probability of identifying devices by including a time factor in identifiers associated with the devices. In particular, including a time factor in device identifiers allows the device tracking system to provide a limited time window in which the identifiers are valid. By limiting the time in which the identifiers are valid, the systems and methods can reduce the probability of falsely identifying devices in connection with actions taken at a third-party content supplier. Limiting the time in which the identifiers are valid also increases the probability of correctly identifying each device to be able to track the device.

FIG. 1 illustrates a schematic diagram of one embodiment of a device tracking system 100. The device tracking system 100 may include, but is not limited to a client device 102, an application store 104, an analytics entity 106, and an application server 108. In one or more embodiments, each of the components of the device tracking system 100 can be in communication with some or all of the other components. Although the components of each of the client device 102, application store 104, analytics entity 106, and the application server 108 of the device tracking system 100 are shown according to a particular configuration in FIG. 1, any of the components may be divided into fewer components, such as into a single component, or divided into more components as may serve a particular implementation. Additionally or alternatively, one or more of the components of each of the client device 102, application store 104, analytics entity 106 and the application server 108 can be on one or more other devices not shown in FIG. 1.

The components can comprise software, hardware, or both. For example, the components can comprise one or more instructions stored on a computer-readable storage medium and executable by processors of one or more computing devices (e.g., client devices 102 and/or server devices). When executed by the one or more processors, the computer-executable instructions of the device tracking system 100 can cause the computing device(s) to perform the document management methods described herein. Alternatively, the components can comprise hardware, such as a special purpose processing device to perform a certain function or group of functions. Additionally or alternatively, the components can comprise a combination of computer-executable instructions and hardware.

Furthermore, the components of the device tracking system 100 may, for example, be implemented as a stand-alone application, as a module of an application, as a plug-in for applications including image processing applications, as a library function or functions that may be called by other applications such as data tracking systems, and/or as a cloud-computing model. Thus, the components of the device tracking system 100 may be implemented as a stand-alone application, such as a desktop or mobile application. Alternatively or additionally, the components of the device tracking system 100 may be implemented in any application that allows client devices 102 to interact with various third-party content suppliers.

In one or more embodiments, the client device 102 can comprise a computing device, such as those described below in relation to FIG. 7. The client device 102 can be any device for interacting with one or more applications locally and/or remotely via a network connection (e.g., an Internet connection). For example, the client device 102 can be a desktop computer, a laptop computer, a mobile device (e.g., tablet or smartphone), or any device that a user may use to interact with the one or more applications. In at least one embodiment, the client device 102 is a mobile device or a hand-held device (i.e., a device sized and configured for use by a single hand).

The client device 102 can include a communication application 110 to facilitate communication with one or more other components in the device tracking system 100. In particular, the communication application 110 can execute a redirection instruction 112 by which the client device 102 is able to access the application store 104 for downloading an application. For example, the communication application 110 can include a web browser, a desktop application, a mobile application, or any other application that may execute the redirection instruction 112 in the form of an advertisement, a hyperlink or any other link that directs the client device 102 to an application download 114 on the application store 104, or an application switch instruction that causes the client device 102 to open a native application for the application store. Although the device tracking system 100 of FIG. 1 depicts the redirection instruction 112 in connection with an application from an application store 104, the redirection instruction 112 can direct the client device 102 to another native application, a website, or another area of an application or website.

According to one or more embodiments, the application store 104 can be any third-party content supplier or third-party application for purchasing and/or downloading applications or other content to the client device 102, as described previously. In particular, the application store 104 may include or be associated with one or more servers hosting application content. The application store 104 can provide access to many applications associated with many different entities. While the application store 104 can track each user's purchase/download history, the application store 104 may prohibit other entities from accessing user histories for privacy or confidentiality reasons.

Because other entities may not have access to user histories on the application store 104, the other entities may still collect information associated with the client devices 102 and track certain actions taken by the client devices 102 with respect to applications downloaded by client devices 102 from the application store 104. In particular, an entity having an application for download in the application store 104 can track information for the downloaded application. For example, the application server 108 can be part of, or associated with, an entity having an application for download in the application store 104. When a client device 102 launches the application, the client device 102 can communicate with the application server 108, for example, to perform one or more operations in connection with the application. Additionally, the application server 108 can collect information about the downloaded application and/or client device 102 after the client device 102 has downloaded or launched the application.

In one or more embodiments, the analytics server can facilitate the collection of information associated with the client device 102, the application store 104, and the application server 108. In particular, the analytics server can facilitate at least some interactions between the client device 102, the application store 104, and the application store 104. For example, the analytics server can track actions performed by the client device 102 to follow a redirection instruction 112 to the application store 104. In another example, the analytics server can track actions performed by the client device 102 to launch an application and interact with the application server 108.

The analytics entity 106 can comprise one or more servers that can communicate with the client device 102, the application store 104, and the application server 108. As illustrated in FIG. 1, the analytics entity 106 may include a campaign manager 116, an identifier manager 118, and a data storage manager 120. Each of the components can perform at least one or more operations associated with collecting information and/or using the collected information associated with the client device 102, the application store 104, and the application server 108. In one or more embodiments, one or more of the components can communicate with one or more of the other components to perform one or more of the operations associated within the device tracking system 100.

In one or more embodiments, the campaign manager 116 can facilitate tracking of certain information associated with a campaign initiated with the analytics entity 106. In particular, the campaign manager 116 can track information related to the redirection instruction 112. For example, the campaign can include an advertising campaign intended to drive user traffic to the application store 104 for a particular application download 114. To illustrate, the campaign manager 116 can track certain information in association with an advertisement presented within the communication application 110 on the client device 102.

In one or more implementations, the campaign manager 116 can manage a plurality of campaigns for a plurality of different client devices 102 and/or systems. Specifically, the campaign manager 116 can generate analytics reports and/or perform other operations for systems other than the device tracking system 100. In one or more embodiments, the campaign manager 116 can use information collected from the device tracking system 100 with other systems, and vice versa.

The analytics entity 106 can also include an identifier manager 118 as previously mentioned. The identifier manager 118 can manage identifiers for a plurality of client devices 102. In particular, the identifier manager 118 can generate identifiers for each client device 102 that participates in a campaign with the analytics entity 106. When a client device 102 initiates a campaign with the analytics entity 106—for example, by following a redirection instruction 112 to the application store 104—the identifier manager 118 can use data collected by the campaign manager 116 to generate an identifier for the client device 102. Additionally, the identifier manager 118 can generate identifiers when a client device 102 performs at least one other action—for example, by launching a downloaded application associated with the redirection instruction 112.

As described above, the device tracking system 100 can include a data storage manager 120 to facilitate storage of information for the device tracking system 100. In particular, the device tracking system 100 can store information used by one or more of the components in the analytics entity 106 or other devices in the device tracking system 100 to facilitate the performance of various operations associated with device tracking. In one embodiment, as shown in FIG. 1, the data storage manager 120 maintains device information 122, location information 124, application information 126, time information 128, a first time-dependent identifier 130, and a second time-dependent identifier 132. The data storage manager 120 may also store any additional or alternative information corresponding to the operation of the device tracking system 100. The data storage manager 120 can maintain additional or alternative data as may serve a particular implementation. The data storage manager 120 may communicate with any component within the analytics entity 106 and device tracking system 100 to obtain or share information for tracking devices associated with the device tracking system 100. In one embodiment, the data storage manager 120 includes one or more servers on which various types of data are stored. For example, the data storage manager 120 may include or may be implemented in a data storage environment.

In one or more embodiments, the device information 122 can include information related to the client device 102. Specifically, the device information 122 can describe certain identifying aspects of the client device 102 that allow the analytics entity 106 to at least partially identify the client device 102. For example, the device information 122 can describe the type of client device 102, including manufacturer of the client device 102, a model of the client device 102, a version of the device, and/or other information that may identify the client device type associated with the redirection instruction 112. The device information 122 may also include information describing an operating system running on the device, including a version of the operating system.

In one or more embodiments, the location information 124 can include information related to a location of the client device 102. In particular, the location information 124 can describe a location associated with the client device 102 at the time of a request to visit a target of the redirection instruction 112. For example, the device tracking system 100 can determine at least a partial IP address of the client device 102 when the client device 102 requests to visit the application store 104 to download the application. In alternative embodiments, the location information 124 can comprise information that indicates a location of the client device 102 other than an IP address. For example, in one or more embodiments the location information can be based on GPS signals, cellular tower triangulation, or other information that indicates a location of the client device 102. The location information 124 can include additional or alternative information about the location of the client device 102, as may serve a particular implementation—e.g., location information 124 for intermediate/forward devices associated with the request.

As previously mentioned, some privacy laws prohibit the collection/use of full IP addresses. Thus, the device tracking system 100 can check only partial IP addresses for the client device 102 in the device tracking system 100. For example, the device tracking system 100 can check only the first three octets of the IP address to determine at least some identification information associated with the location of the client device 102. In alternative embodiments, the device tracking system 100 can check the full IP address (four octets) to determine the identification information associated with the location of the client device 102.

The data storage manager 120 can also store application information 126 associated with the request. Specifically, the application information 126 can include information identifying an application associated with the redirection instruction 112 at the client device 102. For example, when the client device 102 follows the redirection instruction 112 to the application store 104, the device tracking system 100 can determine an application version of the application associated with the redirection instruction 112. In other instances, the device tracking system 100 can determine application information 126 for other applications involved in the request—e.g., the communication application 110.

The data storage manager 120 can store time information 128 associated with the request. Specifically, the time information 128 can include information identifying a time of the request. For example, when the client device 102 requests to visit the application store 104 via the redirection instruction 112, the device tracking system 100 can determine a time for the request. The time for the request can correspond to a time when the client device 102 initiates a campaign with the campaign manager 116 of the analytics entity 106. In other instances, the time for the request can correspond to other operations or actions taken in the campaign.

In one or more embodiments, the time information 128 can include an epoch (Unix) time determined at the time of the request. Specifically, the device tracking system 100 can store the epoch time when the client device 102 first sends the request to visit the application store 104. In some instances, the device tracking system 100 can store the full epoch time associated with the request. In other instances, the device tracking system 100 can truncate the epoch time and store a truncated epoch time.

In one or more embodiments, the data storage manager 120 can store a first time-dependent identifier 130 for one or more requests or visits to the application store initiated via the redirection instruction 112 and/or client devices 102 and a second time-dependent identifier 132 for an application launch or accesses to other content in connection with a third-party content supplier. As previously mentioned, the time-dependent identifiers can include information for identifying a client device 102 in association with one or more actions taken in a campaign initiated with the campaign manager 116. In one or more instances, the time-dependent identifiers are non-unique identifiers to comply with privacy laws and/or limitations placed on data collection by the application store 104. In one instance, the device tracking system 100 can generate a first time-dependent identifier 130 for a client device 102 when the client device 102 performs an initial event (e.g., requests to visit the application store 104 via the redirection instruction 112). In another instance, the device tracking system 100 can generate a second time-dependent identifier 132 for a client device 102 when the client device 102 performs a subsequent event (e.g., launches an application downloaded from the application store 104 and communicates with the application server 108).

In additional embodiments, the device tracking system 100 can generate additional time-dependent identifiers for a client device 102 for an action associated with the downloaded application. Specifically, the client device 102 can communicate with the application server 108 when launching the application. For example, the device tracking system 100 can collect the same information from a client device 102 launching an application as from a client device 102 requesting to visit the application store 104 via a redirection instruction 112. To illustrate, the device tracking system 100 can gather device information 122, location information 124, time information 128, and application information 126 from the client device 102 when the client device 102 launches the application to generate a second time-dependent identifier 132 for the client device 102.

In one or more embodiments, the analytics entity 106 can obtain at least some of the device information 122, location information 124, application information 126, and time information 128 from the client device 102 at the time of the request to follow the redirection instruction 112. Specifically, the client device 102 can include a user-agent that collects and sends the corresponding information to the analytics entity 106. For example, the communication application 110 can act as a user-agent to collect the corresponding information and send the information in the header of a communication to the analytics entity 106. In other examples, the user-agent can be another application collecting the identification information and communicating with the analytics entity 106.

Figure 2:
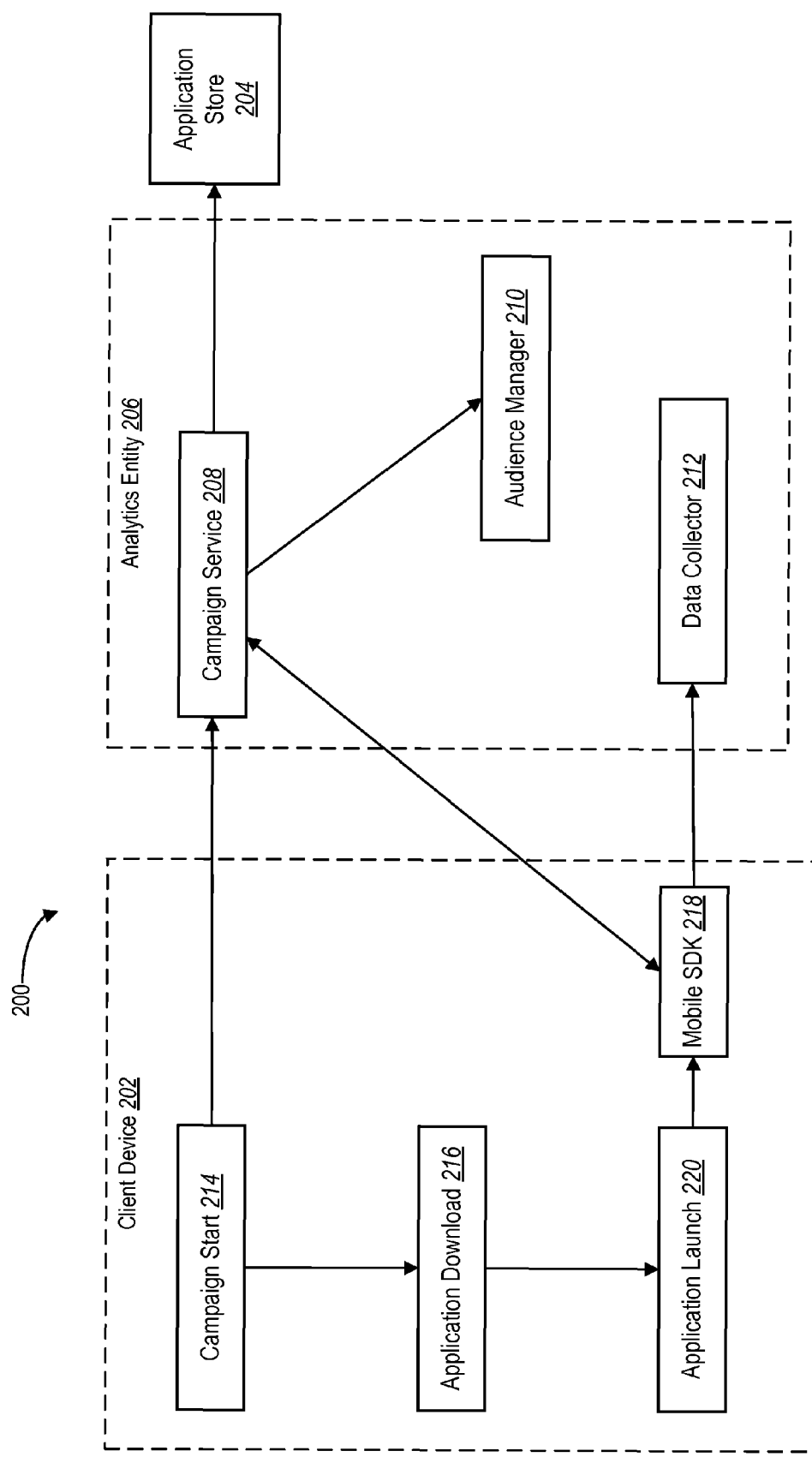
FIG. 2 illustrates another schematic diagram of a device tracking system in accordance with one or more embodiments.

As previously mentioned, the device tracking system 100 can track mobile devices in a campaign initiated with an analytics entity 106. FIG. 2 illustrates a schematic diagram of one embodiment of a device tracking system 200. In one embodiment, the device tracking system 200 includes a client device 202, an analytics entity 206, and the application store 204. Although the analytics entity 206 of FIG. 2 is depicted as having various components, the analytics entity 206 may have any number of additional or alternative components. For example, the analytics entity 206 can be implemented on a single computing device or one multiple computing devices within the device tracking system 200. Additionally, although FIG. 2 depicts the analytics entity 206 in a device tracking system 200 for collecting information about client device 202 interactions with an application store 204, the analytics entity 206 can facilitate the collection and use of analytics data for one or more different client devices 202 with one or more other third-party content suppliers or third-party applications.

As depicted in FIG. 2, the device tracking system 200 can include a campaign service 208, an audience manager 210, and a data collector 212. In one or more embodiments, the campaign service 208, the audience manager 210, and/or the data collector 212 may perform one or more of the operations described above in relation to the campaign manager 116, the identifier manager 118, and/or the data storage manager 120 in FIG. 1. In additional or alternative embodiments, the device tracking system 200 may include other components to perform one or more of the operations described in relation to the components of the analytics entity 206 in FIG. 1.

According to various embodiments, the client device 202 can initiate a campaign with the analytics entity 206. In particular, at a campaign start 214, the client device 202 can follow a redirection instruction 112 (e.g., by a user selecting the redirection instruction 112) to visit the application store 204. For instance, the redirection instruction 112 can direct the client device 202 to an application download 216 for a particular application at the application store 204. In other words, the redirection instruction 112 can direct an application at the client device 202 to a view in the application store 204 from which the client device 202 can download the application.

In one or more embodiments, the application store 204 may be a third-party content supplier, such that the analytics entity 206 may not have access to data associated with the application store 204. The application store 204 may also prohibit the use of unique identifiers (e.g., MAC address, UUID) for client devices 202 visiting the application store 204 and downloading applications from the application store 204. Thus, the analytics entity 206 may not be able to determine that the client device 202 has reached the application download 216 at the application store 204 and/or downloaded the particular application by directly tracking the client device 202 with a unique identifier.

In one or more embodiments, the analytics entity 206 can collect information for identifying client device 202 interactions with the application store 204. Specifically, the analytics entity 206 can determine that the client device 202 has initiated a campaign associated with a redirection instruction 112 to an application download 216 at the application store 204 based on non-unique information related to the request to visit the application store 204. In one instance, the client device 202 sends information to the campaign service 208 at the analytics entity 206 when requesting to visit the application store 204. For example, following the redirection instruction can cause a tracking pixel to fire that notifies the campaign service 208.

According to one or more embodiments, the campaign service 208 notifies the audience manager 210 that the client device 202 has initiated a campaign. The audience manager 210 can facilitate the generation of the time-dependent identifier related to the request from the client device 202. In particular, the campaign service 208 can collect information from the client device 202 in the request associated with the redirect, and send the information to the audience manager 210 for the audience manager 210 to generate the time-dependent identifier. In one embodiment, the audience manager 210 can store the time-dependent identifier for identifying the client device 202. In alternative embodiments, another component of the analytics entity 206 can store the time-dependent identifier.

In one or more embodiments, the downloaded application can include a mobile SDK (software development kit) 218 at the client device 202 for communicating with the analytics entity 206. Specifically, the mobile SDK 218 can include code that causes the client device 202 to send information to the campaign service 208. For example, during or after an application launch 220 at the client device 202, the mobile SDK 218 that is included in the application can send identification information to the campaign service 208 while the campaign service 208 monitors for access to content in connection with the redirection instruction 112 and/or the application store 204. The campaign service 208 can forward the identification information to the audience manager 210.

When the audience manager 210 receives the identification information in response to the application launch 220 at the client device 202, the audience manager 210 can generate a second time-dependent identifier 132 based on the new identification information. After generating the second time-dependent identifier 132, the audience manager 210 can determine whether another time-dependent identifier stored at the analytics entity 206 matches the second time-dependent identifier 132. If the audience manager 210 determines that there is a matching time-dependent identifier, the audience manager 210 can determine that the client device 202 that sent the initial request is the same client device 202 that launched the application.

After verifying that the client device 202 that launched the application is the same that initiated the campaign, the audience manager 210 can notify the campaign service 208 of campaign end 220. The audience manager 210 can send a campaign end signal to the campaign service 208, which notifies the application on the client device 202 via the mobile SDK 218. In addition, the campaign service 208 can forward a segment response associated with the campaign (e.g., a campaign code) from the audience manager 210 to the application, and the application can send the segment response to the data collector 212. Once the application receives the segment code, the audience manager 210 can set a value indicating that attribution of the client device 202 to the campaign is successful.

Because the mobile SDK 218 sends the campaign code for the campaign associated with the application to the data collector 212, the data collector 212 can track any data associated with the application and/or user and associate the tracked data with the original campaign. Additionally, once the campaign ends and the audience manager 210 marks successful attribution of the campaign, the campaign service 208 and audience manager 210 can assure that no more client devices 202 are attributed to the successful campaign. Thus, the analytics entity 206 can avoid falsely identifying one or more client devices 202 having the time-dependent identifier with the campaign.

Figure 3:
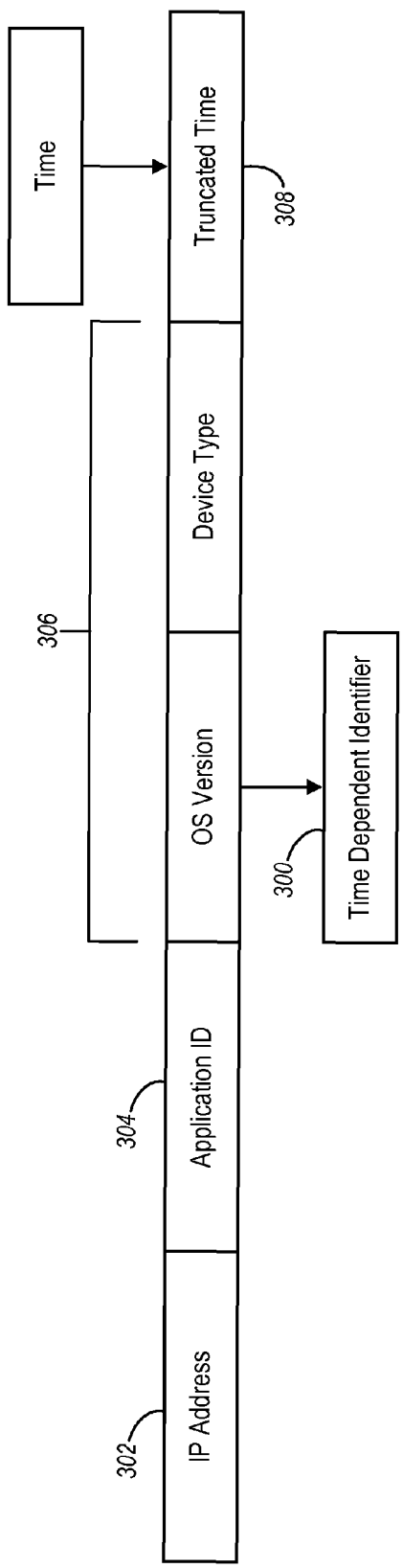
FIG. 3 illustrates a block diagram of a time-dependent identifier in accordance with one or more embodiments.

As previously mentioned, the device tracking system 200 assigns a time-dependent identifier to a client device 202 for a particular campaign. FIG. 3 illustrates a block diagram of a time-dependent identifier 300. In one or more embodiments, the time-dependent identifier 300 includes location information 302, application information 304, device information 306, and time information or a time 308. In additional or alternative embodiments, the time-dependent identifier 300 can include other information not described herein.

The location information 302 can comprise any of the information described herein above that can indicate a location of a mobile device. According to one or more embodiments, the location information 302 includes an IP address corresponding to a location from which the client device 202 requests to visit the third-party content supplier. In some examples, the device tracking system 200 determines only the first three octets of the IP address to comply with privacy laws governing IP addresses. In other examples, the device tracking system 200 can determine all four octets of the IP address. In yet other examples, the device tracking system 200 can determine the number of octets of the IP address for the client device 202 based on the country of the client device 202.

In one or more embodiments, the application information 304 includes information about the application that the client device 202 downloads from the third-party content supplier. For example, the application information 304 can include a version of the application, such that when the client device 202 launches the application, the device tracking system 200 can determine that the launched application corresponds to the redirection instruction 112. The device tracking system 200 can bundle the application information 304 in a configuration file for the mobile SDK 218 and/or pass the application information 304 at campaign start 214. In other examples, the application information 304 can include additional or alternative information describing the application or another application (e.g., the communication application 110 used to select the redirection instruction 112). In alternative embodiments, the time-dependent identifier 300 does not include application information 304—for example, if the redirection instruction 112 corresponds to an action at a third-party content supplier unrelated to the download of an application.

In one or more embodiments, the device information 306 can include information about the client device 202 making the request to visit the third-party content supplier. For example, the device information 306 can include an operating system version of the operating system running on the client device 202. The device information 306 can also include a device type of the client device 202 (e.g., the make and/or model of the client device 202). The operating system version and the device type can provide identification information that is not specifically unique to the client device 202, but still provides some way of identifying characteristics of the client device 202. In one or more implementations, the device tracking system 200 can determine the device information 306 from a user-agent at the client device 202.

In one or more embodiments, the time information 308 can include a time at which the client device 202 requests to visit the third-party content supplier. In one example, the time information 308 can include an epoch time captured at the time the client device 202 makes the request. In another example, the time information 308 can include an alternative time value, such as a formatted date string defining the time of the request.

In additional or alternative embodiments, the time information 308 can include one or more keys changed by the device tracking system 200 based on how much time has passed since the one or more keys were last changed. For example, the device tracking system 200 can create a key for a particular time-dependent identifier 300 based on the time at which the device tracking system 200 creates the time-dependent identifier 300. Thus, each time-dependent identifier 300 with a time during a window of N seconds would have the same key. After a predetermined amount of time, the device tracking system 200 can change the key such that each key corresponds to a separate window of time. The window of time can comprise ten minutes, fifteen minutes, a half an hour, forty minutes, fifty minutes, an hour, a day, a week, or another period of time.

In one or more embodiments, the key can comprise a secret key value known only to the device tracking system 200. The device tracking system 200 can append the secret key value to, or otherwise include the secret key value in, each identifier that includes the other identification information to create time-dependent identifiers 300. The device tracking system 200 can change or reset the secret key value after a predetermined amount of time.

According to one or more embodiments, the device tracking system 200 can truncate a time value in the time information 308 to create a truncated time value. Specifically, truncating the time value allows the device tracking system 200 to create a time-dependent identifier 300 that is valid for a predetermined amount of time based on the number of digits removed from the time value. For example, the device tracking system 200 can truncate an epoch time value by removing the final three digits of the epoch time value to create a truncated time value that is valid for 1000 seconds. In alternative examples, the device tracking system 200 can truncate the epoch time value or another time value to create a truncated time value that is valid for a different predetermined amount of time.

In addition to truncating the time value, the device tracking system 200 can separate time values into groups (or "buckets") based on the final digit of the time values. In some instances, the device tracking system 200 can separate the time values into buckets by dividing a final digit of a given time value by a predetermined number. The device tracking system 200 can determine the predetermined number based on the number of buckets, and the number of buckets is based on the valid time window associated with the time-dependent identifiers 300.

In one example in which a given time value is "1380753242", the device tracking system 200 can first truncate the time value by removing the last three digits to obtain "1380753". The device tracking system 200 can then divide the final digit of the truncated value by three to obtain "1380751". In one embodiment, the device tracking system 200 can also round the final digit of the truncated value down to the closest integer after dividing the final digit by the predetermined number (e.g., by using the floor function for the final digit). Given that the predetermined number is three in the present example, the device tracking system 200 can place the associated time-dependent identifier 300 into one of three buckets based on the final digit of the truncated time value (e.g., 0-3, 4-6, or 7-9).

As illustrated in FIG. 3, the device tracking system 200 can generate a hash value using a concatenated string including the device information 306, the application information 304, the location information 302, and the time information 308. For example, the hash value can be a SHA-1 hash value. In alternative examples, the hash value can be any type of hash value or other encoded value. In one or more embodiments, the hash value is the time-dependent identifier 300 used to identify the client device 202. In alternative embodiments, the time-dependent identifier 300 can be generated based on the hash value.

Figure 4:
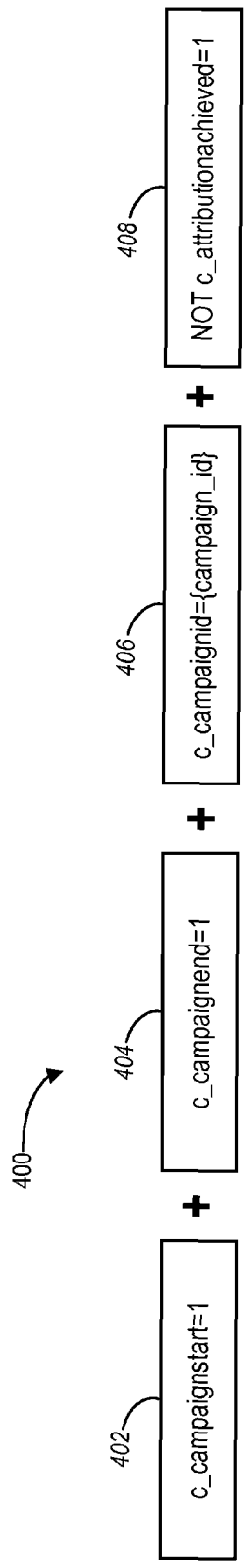
FIG. 4 illustrates a block diagram of a campaign segment in accordance with one or more embodiments.

As previously mentioned, a device tracking system 200 can manage campaigns initiated by one or more client devices 202. FIG. 4 illustrates a block diagram of a campaign segment 400 associated with a campaign. The device tracking system 200 can use the campaign segment 400 to indicate that the client device 202 corresponds to the campaign. In one or more embodiments, the campaign segment 400 can include a campaign start segment 402, a campaign end segment 404, a campaign code segment 406, and a campaign attribution segment 408. Although the campaign segment 400 of FIG. 4 includes certain variables, the campaign segment 400 may include additional or alternative segments, as may serve a particular implementation.

According to various embodiments, the campaign start segment 402 can include a value indicating whether a campaign has begun. Specifically, the device tracking system 200 can determine that the campaign has begun based on the value stored in the campaign start segment 402. For example, the campaign service 208 of the device tracking system 200 can send a campaign start signal to the audience manager 210 to begin a campaign, causing the audience manager 210 to set the value of the campaign start segment 402 to "1". In alternative examples, the device tracking system 200 can set the value of the campaign start segment 402 to a predetermined value indicating that the campaign has begun in response to other actions.

In one or more embodiments, the campaign end segment 404 can include a value indicating whether the campaign has ended. Specifically, the device tracking system 200 can determine that the campaign has ended based on the value stored in the campaign end segment 404. For example, the campaign service 208 of the device tracking system 200 can send a campaign end signal to the audience manager 210, causing the audience manager 210 to set the value of the campaign end segment 404 to "1".

In various embodiments, the campaign code segment 406 can include an identifier for the campaign. Specifically, the device tracking system 200 can identify the campaign based on the identifier value in the campaign code segment 406. For example, the identifier can be a unique identifier (e.g., a campaign code) for the campaign that allows the device tracking system 200 to identify the campaign. The device tracking system 200 can also use the campaign code in associating additional analytics data with a particular client devices 202 once the device achieves successful attribution.

According to one or more implementations, the campaign attribution segment 408 can include a value indicating whether the campaign has achieved successful attribution. Specifically, the device tracking system 200 can determine that the campaign is successful and a client device 202 and/or user is attributed to the campaign and set the value of the campaign attribution segment 408 based on the attribution of the client device 202 to the campaign. For example, when the client device 202 launches the application and receives the campaign code from the analytics entity 206, the audience manager 210 can change the value of the campaign attribution segment 408 to a value corresponding to successful attribution (e.g., "1").

Setting the campaign attribution segment 408 to a value indicating successful attribution can prevent the analytics entity 206 from attributing the campaign to other client devices 202. Specifically, when the device tracking system 200 sets the value of the campaign attribution segment 408 to indicate successful attribution, the device tracking system 200 can prevent the audience manager 210 from attributing the campaign to other client devices 202 having the same time-dependent identifier. In one or more embodiments, the device tracking system 200 can remove the campaign segment 400 after the time-dependent identifier has expired, which may allow the campaign code to be reused, if necessary.

In one or more embodiments, the device tracking system 200 can determine that the campaign has achieved attribution by determining that the client device 202 launched the application within a time window associated with the time-dependent identifier. In other embodiments, the device tracking system 200 can determine that the campaign has not achieved attribution by determining that the client device 202 launched the application after the time-dependent identifier has expired. In one or more other embodiments, the device tracking system 200 can determine that the client device 202 is not attributed to the campaign because the campaign has already achieved successful attribution.

In one or more embodiments, the device tracking system 200 can track and/or use other information associated with the client device 202 and/or campaign. For example, the device tracking system 200 can use a delivery point identifier to identify a conversion source for the campaign. In another example, the device tracking system 200 can use the time-dependent identifier in conjunction with the campaign segment 400 when the campaign starts, ends, and achieves attribution. In other examples, the device tracking system 200 can additional or alternative information associated with the client device 202, the downloaded application, and/or the campaign for tracking the client device 202.

Figure 5:
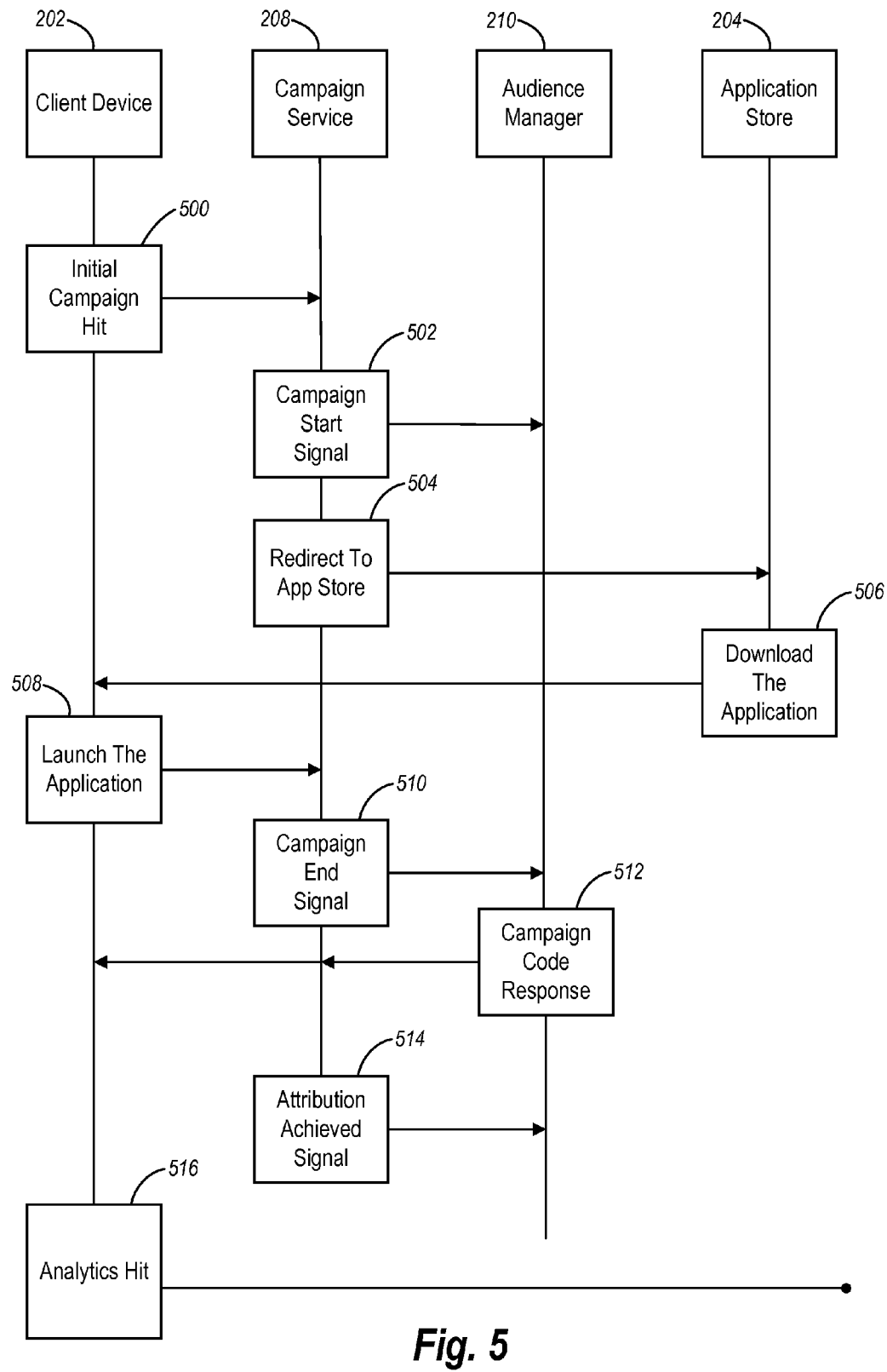
FIG. 5 illustrates a sequence-flow diagram of interactions between the client device, campaign service, audience manager, and application store of the device tracking system of FIG. 2 in accordance with one or more embodiments.

FIG. 5 illustrates a sequence-flow diagram of interactions between the client device 202, campaign service 208, audience manager 210, and application store 204 of the device tracking system 200 of FIG. 2. As shown, each of the components can communicate with each of the other components during various acts in the device tracking process. While FIG. 5 depicts a process in conjunction with the device tracking system 200 of FIG. 2, the device tracking process of FIG. 5 can be used in conjunction with any suitable device tracking system 200.

In one embodiment, the client device 202 sends an initial campaign hit 500 to the campaign service 208. The client device 202 can send the initial campaign hit 500 as a result of any action taken by a user at the client device 202 in association with a redirection instruction 112. In particular, the client device 202 can send the initial campaign hit 500 to the campaign service 208 in response to a selection of the redirection instruction 112 by the user. Alternatively, the placement of an advertisement, a request for an advertisement, the launching of an application, or another event can cause or comprise the client device to send the initial campaign hit 500. Additionally, the initial campaign hit 500 can include or be associated with information for generating a time-dependent identifier for the client device 202 (e.g., in a header from a user-agent at the client device 202).

When the campaign service 208 receives the initial campaign hit 500 from the client device 202, the campaign service 208 can begin the campaign by notifying the audience manager 210. Specifically, the campaign service 208 can send a campaign start signal 502 to the audience manager 210. The campaign start signal 502 can include or be accompanied by additional information for generating the time-dependent identifier at the audience manager 210. In one example, the campaign service 208 can generate the time-dependent identifier and send the time-dependent identifier to the audience manager 210 for storage in connection with the campaign.

The campaign service 208 can also redirect 504 the client device 202 to the application store 204. In particular, the campaign service 208 can redirect the client device 202 in response to receiving the initial campaign hit 500. For example, the campaign service 208 can send a uniform resource locator back to the client device 202 to point the client device 202 to the application download 216 at the application store 204. Alternatively, the initial campaign hit 500 can automatically cause the client device 202 to redirect to the application store 204, such as via an application switch instruction. In other embodiments, the campaign service 208 can redirect the client device 202 at any time after receiving the initial campaign hit 500 from the client device 202.

The client device 202 can download 506 the application at any time after being redirected to the application store 204. The client device 202 can then launch 508 the application downloaded from the application store 204. In one or more embodiments, the client device 202 can launch the application within the time window associated with the time-dependent identifier. The application may include code that notifies the campaign service 208 when the client device 202 launches the application. The application may also send other information associated with the application launch 220 and/or client device 202 in response to the application launch 220. For example, the application can send identification information for generating a second time-dependent identifier 132.

When the campaign service 208 receives the indication that the client device 202 has launched the application, the campaign service 208 can end the campaign. Specifically, the campaign service 208 can notify the audience manager 210 that the campaign has ended. For example, the campaign service 208 can send a campaign end signal 510 to the audience manager 210 so that the audience manager 210 can update a campaign segment 400 for the campaign.

When the audience manager 210 has updated the campaign segment 400 for the campaign, the audience manager 210 can send a response to the campaign service 208. In particular, the campaign service 208 can notify the campaign service 208 by sending a campaign code response 512 to the campaign service 208. For example, the audience manager 210 can send a campaign code segment 406 to the campaign service 208 to notify the campaign service 208 of the particular campaign. In one or more implementations, the audience manager 210 can send other information corresponding to the campaign and/or campaign segment 400 in the campaign code response 512. The campaign service 208 may or may not forward the campaign code response 512 to the application, as may serve a particular embodiment.

In one or more embodiments, the audience manager 210 sends the campaign code response 512 to the campaign service 208 in response to determining that a time-dependent identifier associated with the client device 202 based on the application launch 220 matches another time-dependent identifier stored at the audience manager 210. Specifically, the audience manager 210 can determine that the time-dependent identifier associated with the application launch 220 matches a time-dependent identifier associated with the initial campaign hit 500. If the audience manager 210 determines that the time-dependent identifiers do not match, the audience manager 210 may not send a campaign code response 512 to the campaign service 208. In other embodiments, another component or device within the device tracking system 200 can determine whether the time-dependent identifiers match.

In one or more embodiments, the campaign service 208 can determine whether the client device 202 should be attributed to the campaign in response to determining that the application at the client device 202 has received the campaign code response 512. For example, the campaign service 208 can communicate with the application via a mobile SDK 218 configured to specifically communicate certain information with the campaign service 208. To illustrate, the campaign service 208 can send the campaign code response 512 to the client device 202 via the application, and the client device 202 can respond to the campaign service 208 that the application received the campaign code response 512. In other embodiments, the campaign service 208 can determine that the client device 202 should be attributed to the campaign without sending the campaign code response 512 to the client device 202.

The campaign service 208 can notify the audience manager 210 that the application has received the campaign code response 512. In particular, the campaign service 208 can send an attribution-achieved signal 514 to the audience manager 210 to notify the audience manager 210 that the campaign has achieved attribution for the campaign associated with the campaign code response 512. According to one example, the audience manager 210 can update the campaign segment 400 to reflect successful attribution of the campaign and to prevent the device tracking system 200 from attributing other client devices 202 to the campaign.

In one or more embodiments, the client device 202 can communicate with an application server 108 or other entity associated with the application after launching the application. Specifically, the client device 202 can send an analytics hit 516 including the campaign code to the application server 108 at any time after receiving the campaign code from the campaign service 208. The campaign code can be associated with the client device 202 and/or the user at the application server 108 to allow the application server 108 or another entity to attribute additional interactions with the application to the client device 202 and/or the user.

FIGS. 1-5, the corresponding text, and the examples, provide a number of different systems and devices for device tracking and identification. In addition to the foregoing, embodiments of the present invention also can be described in terms of flowcharts comprising acts and steps in a method for accomplishing a particular result. For example, FIGS. 6 and 7 illustrate flowcharts of exemplary methods in accordance with one or more embodiments.

Figure 6:
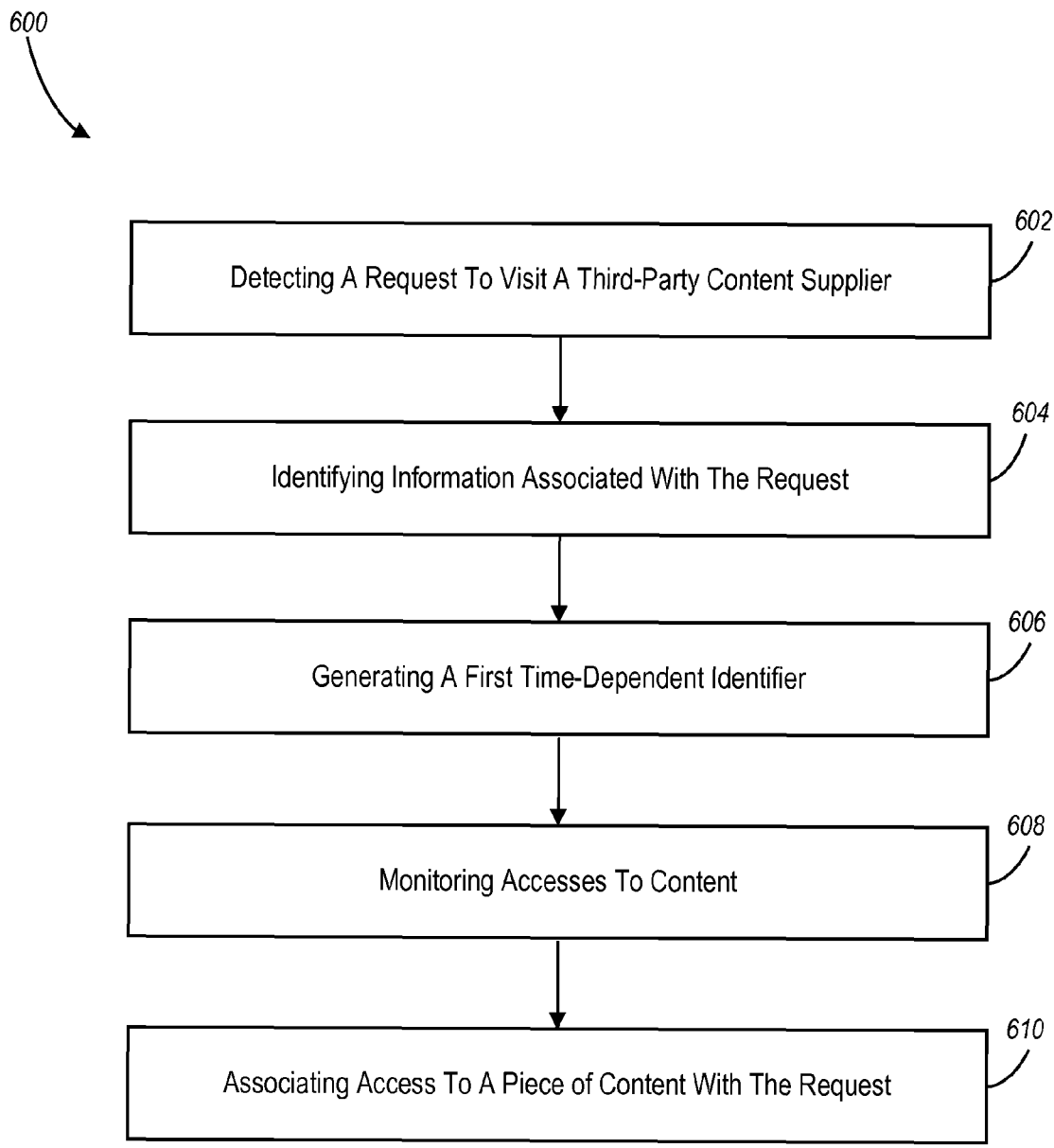
FIG. 6 illustrates a flowchart of a method of device tracking in accordance with one or more embodiments.

FIG. 6 illustrates a flowchart of a series of acts in a method of device tracking. The method 600 includes an act 602 of detecting a request to visit a third-party content supplier. Specifically, act 602 can involve detecting, at a server 106, 206, a request from a client device 102, 202 to visit a third-party content supplier in association with a redirection instruction 112. For example, the request can be in connection with a request to download an application. To illustrate, the third-party content supplier can comprise a third-party application store 104, and the redirection instruction 112 can comprise an application switch instruction to the third-party application store to allow for downloading of the application.

Specifically, act 602 can involve receiving a notification that an advertisement, an in-app purchase option, a link, or other event has occurred at the client device 102, 202. For example, an advertisement for an application can include a tracking pixel. Upon a user selecting the advertisement, the client device 102, 202 can send a request for the pixel to the server 106. 206. Alternatively, act 602 can involve receiving a server call from an SDK on the client device 102, 202 upon a user selection an in-app purchase option or performing another action.

The method 600 also includes an act 604 of identifying information associated with the request. In particular, act 604 involves identifying, by the server 106, 206 and in response to the request, device information 122, 302 associated with the client device 102, 202, location information 124, 306 associated with the client device 102, 202, and time information 128, 308 associated with the request. For example, act 604 can involve determining at least one of an operating system version for the client device 102, 202 or a device type for the client device 102, 202. Act 604 can also involve determining a truncated Internet Protocol address for the particular client device 102, 202.

In one example, act 604 can involve determining a request time associated with the request, truncating the request time, and generating a valid time window for the first time-dependent identifier 130 based on the truncated request time. Additionally, truncating the request time can involve removing at least one digit from an epoch time associated with the request, dividing a remaining final digit of the epoch time by a predetermined number, and rounding the final digit of the epoch time down to a closest integer. As part of act 604, or as an additional act, the method 600 can also include assigning the first time-dependent identifier 130 to one of a plurality of identifier groups based on the final digit of the epoch time and the predetermined number.

Additionally, the method 600 includes an act 606 of generating a first time-dependent identifier 130. Specifically, act 606 involves generating, by the server 106, 206, a first time-dependent identifier 130 for the client device 102, 202 using or based on the device information 122, 302, the location information 124, 306 and the time information 128, 308. For example, act 606 can involve generating a concatenated number by combining a number representing the device information 122, 302 associated with the client device 102, 202, a number representing the location information 124, 306 associated with the client device 102, 202, and a number representing the time information 128, 308 of the request. Act 606 can also involve performing a hash on the aggregated number.

The method 600 also includes an act 608 of monitoring accesses to content. In particular, act 608 involves monitoring, by the server 106, 206, accesses to content provided by the third-party content supplier. For example, act 608 can involve receiving, from client devices, indications of launches of the application.

Additionally, the method 600 includes an act 610 of associating access to a piece of content with the request. Specifically, act 610 involves associating, by the server 106, 206, an access to a piece of content provided by the third-party content supplier with the request based on the first time-dependent identifier 130 corresponding to a second time-dependent identifier 132 associated with the access to the piece of content.

As part of act 610, or as an additional act, the method 600 can include identifying, by the server 106, 206 and in response to the access, device information 122, 302 associated with a device that accessed the piece of content, location information 124, 306 associated with the device that accessed the piece of content, and time information 128, 308 associated with the access to the piece of content. The method 600 can also include using the device information 122, 302 associated with the device that accessed the piece of content, location information 124, 306 associated with the device that accessed the piece of content, and time information 128, 308 associated with the access to the piece of content. The method 600 can also include comparing the first time-dependent identifier 130 to the second time-dependent identifier 132, and determining that the first time-dependent identifier 130 matches the second time-dependent identifier 132.

Figure 7:
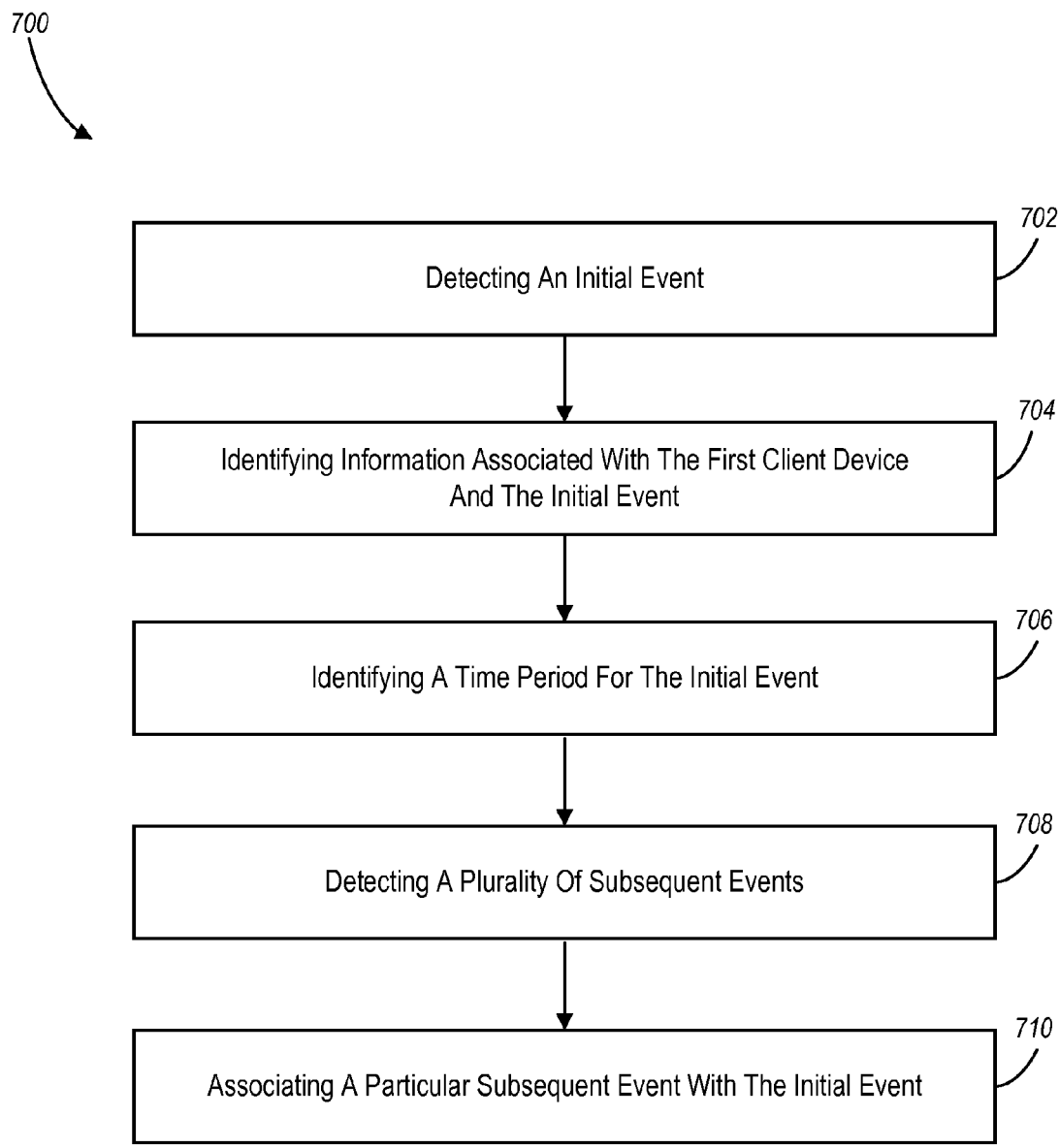
FIG. 7 illustrates a flowchart of a method of device identification in accordance with one or more embodiments.

FIG. 7 illustrates a flowchart of a series of acts in a method 700 of device identification. The method 700 includes an act 702 of detecting an initial event. Specifically, act 702 involves detecting, by a server 106, 206, an initial event associated with a first client device 102, 202. For example, act 702 can involve detecting a request from the first client device 102, 202 to visit a third-party content supplier for downloading an application.

The method 700 also includes an act 704 of identifying information associated with the first client device 102, 202 and the initial event. In particular, act 704 involves identifying, by the server 106, 206 and in response to the initial event, device information 122, 302 associated with the first client device 102, 202, location information 124, 306 associated with the first client device 102, 202 at a time of the initial event.

As part of act 704, or as an additional act, the method 700 can include generating a first time-dependent identifier based on the device information 122, 302 associated with the first client device 102, 202, location information 124, 306 associated with the first client device 102, 202 at a time of the initial event, and time information 128, 308 associated with the initial event.

Additionally, the method 700 includes an act 706 of identifying a time period for the initial event. Specifically, act 706 involves identifying a time period associated with the time information 128, 308 for the initial event. For example, the method can involve truncating the time of the initial event and generating the time period based on the truncated time of the initial event.

The method 700 includes an act 708 of detecting a plurality of subsequent events. Specifically, act 708 involves detecting, by the server 106, 206, a plurality of subsequent events associated with one or more client devices. For example, act 708 can involve detecting purchases, website hits, application launches, or other events related to a campaign. Additionally, act 708 can involve identifying, by the server 106, 206 and in response to each subsequent event, device information 122, 302 associated with the client device 102, 202 performing the subsequent event, location information 124, 306 associated with the client device 102, 202 at a time of the subsequent event, and a time of the subsequent event.

The method 700 also includes an act 710 of associating a particular event with the initial event. In particular, act 710 involves associating, by the server, a particular subsequent event with the initial event based on device information 122, 302 associated with the particular subsequent event corresponding to the device information 122, 302 associated with the first client device 102, 202, location information 124, 306 associated with the particular subsequent event corresponding to the location information 124, 306 associated with the first client device 102, 202 at the time of the initial event, and time of the particular subsequent event being within the identified time period. As part of act 710, or as an additional act, the method 700 can also include determining that the first time-dependent identifier matches the second time-dependent identifier, and associating the client device 102, 202 with a campaign corresponding to the initial event. As part of act 710, or as an additional act, the method 700 can include determining that the first time-dependent identifier corresponds to a second time-dependent identifier associated with the particular event, and associating the first client device 102, 202 with a campaign corresponding to the initial event.

One or more embodiments may comprise or utilize a special purpose or general-purpose computer including computer hardware, such as, for example, one or more processors and system memory, as discussed in greater detail below. One or more embodiments also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing the methods described herein. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
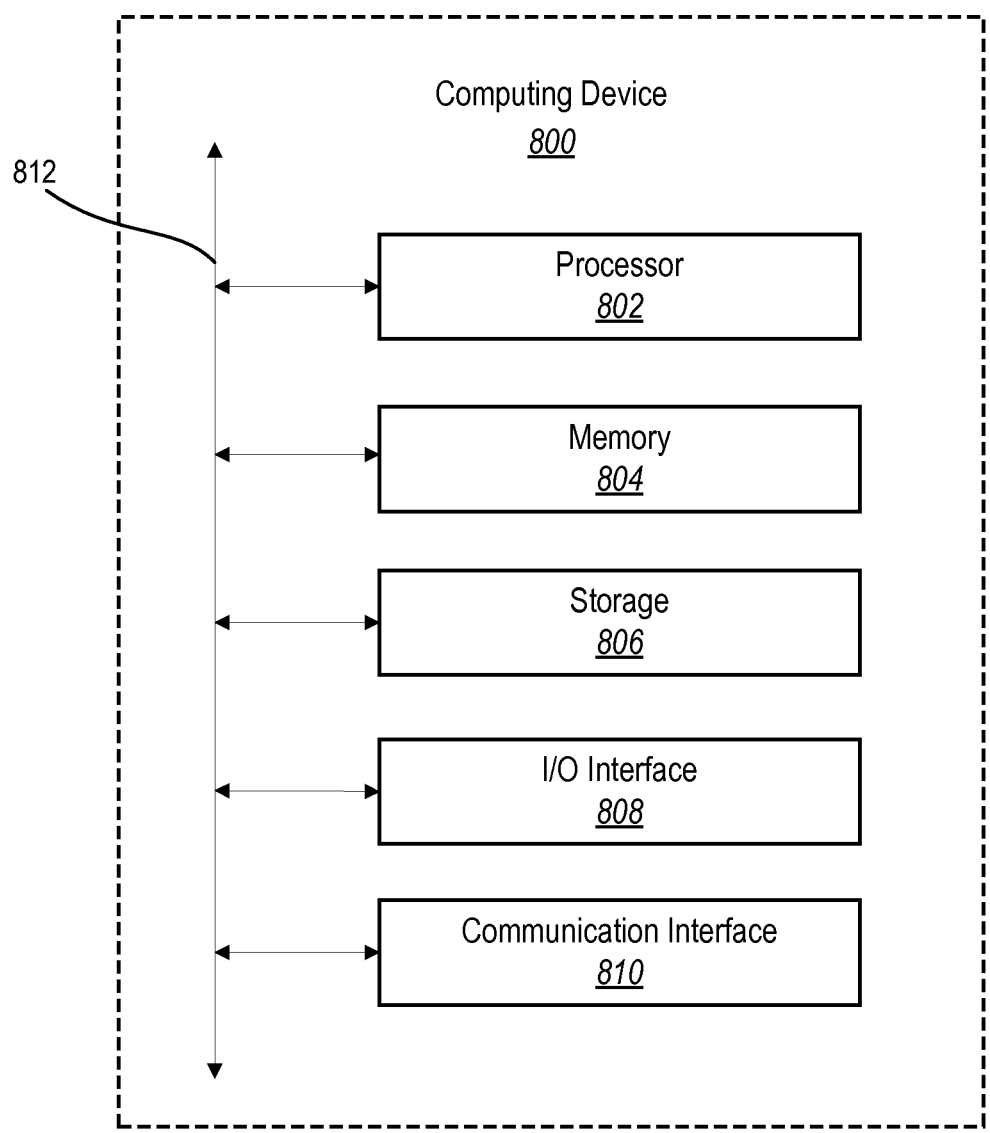
FIG. 8 illustrates a block diagram of an exemplary computing device in accordance with one or more embodiments.

FIG. 8 illustrates a block diagram of an exemplary computing device that may be configured to perform one or more of the processes described above. One will appreciate that the client device 102, 202 or analytics entity 106, 206 can comprise implementations of the computing device 800. As shown by FIG. 8, the computing device can comprise a processor 802, memory 804, a storage device 806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 800 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, various embodiments and aspects are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

One or more embodiments of the present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of device tracking, comprising:
   detecting, by a server, a request from a client device to visit a third-party content supplier in association with a redirection instruction;
   identifying, by the server and in response to the request, device information associated with the client device, location information associated with the client device, and a time of the request;
   generating, by the server, a first time-dependent identifier for the client device using the device information, the location information, and the time of the request;
   monitoring, by the server, accesses to content provided by the third-party content supplier; and
   associating, by the server, an access to a piece of content provided by the third-party content supplier with the request based on the first time-dependent identifier corresponding to a second time-dependent identifier associated with the access to the piece of content.

2. The method as recited in claim 1, further comprising:
   identifying, by the server and in response to the access, device information associated with a device that accessed the piece of content, location information associated with the device that accessed the piece of content, and a time of the access to the piece of content; and
   generating, by the server, the second time-dependent identifier using the device information associated with the device that accessed the piece of content, location information associated with the device that accessed the piece of content, and the time of the access to the piece of content.

3. The method as recited in claim 2, further comprising:
   comparing the first time-dependent identifier to the second time dependent identifier; and
   determining that the first-time dependent identifier matches the second time dependent identifier.

4. The method as recited in claim 3, wherein:
   the request is in connection with a request to download an application;
   the third-party content supplier comprises a third-party application store; and
   the redirection instruction comprises an application switch instruction to the third-party application store to allow for downloading of the application.

5. The method as recited in claim 4, wherein monitoring, by the server, accesses to content provided by the third-party content supplier comprises receiving, from client devices, indications of launches of the application.

6. The method as recited in claim 1, wherein generating, by the server, the first time-dependent identifier for the client device using the time of the request comprises:
   truncating the time of the request; and
   generating a time window for the first time dependent identifier based on the truncated time of the request.

7. The method as recited in claim 6, wherein truncating the time of the request further comprises:
   removing at least one digit from an epoch time of the request;
   dividing a remaining final digit of the epoch time by a predetermined number; and
   rounding the final digit of the epoch time down to a closest integer.

8. The method as recited in claim 7, further comprising assigning the first time-dependent identifier to one of a plurality of identifier groups based on the final digit of the epoch time and the predetermined number.

9. The method as recited in claim 1, wherein determining the device information associated with the client device comprises determining at least one of an operating system version for the client device or a device type for the client device.

10. The method as recited in claim 1, wherein determining the location information associated with the client device comprises determining a truncated Internet Protocol address for the client device.

11. The method as recited in claim 1, wherein the first time-dependent identifier further comprises an application identifier for an application associated with the redirection instruction.

12. The method as recited in claim 1, wherein generating the first time-dependent identifier comprises:
generating a concatenated number by combining a number representing the device information associated with the client device, a number representing the location information associated with the client device, and a number representing the time of the request; and
performing a hash on the concatenated number.

13. A method of device identification, comprising:
detecting, by a server, an initial event performed by a first client device;
identifying, by the server and in response to the initial event, device information associated with the first client device, location information associated with the first client device at a time of the initial event, and the time of the initial event;
identifying a time period associated with the time of the initial event;
detecting, by the server, a plurality of subsequent events associated with one or more client devices; and
associating, by the server, a particular subsequent event, of the plurality of subsequent events, with the initial event based on device information associated with the particular subsequent event corresponding to the device information associated with the first client device, location information associated with the particular subsequent event corresponding to the location information associated with the first client device, and a time of the particular subsequent event being within the identified time period.

14. The method as recited in claim 13, further comprising generating a first time-dependent identifier based on the device information associated with the first client device, location information associated with the first client device at the time of the initial event, and the time of the initial event.

15. The method as recited in claim 14, wherein generating the first time-dependent identifier further comprises:
truncating the time of the initial event; and
generating the time period based on the truncated time of the initial event.

16. The method as recited in claim 13, wherein the initial event corresponds to a request from the first client device to visit a third-party content supplier for downloading an application, and the particular subsequent event corresponds to a launch of the application.

17. The method as recited in claim 13, further comprising:
determining that the first time-dependent identifier corresponds to a second time-dependent identifier associated with the particular subsequent event; and
associating the first client device with a campaign corresponding to the initial event.

18. A system for device tracking, comprising:
at least one processor;
at least one non-transitory computer readable storage medium storing instructions thereon, that, when executed by the at least one processor, cause the system to:
detect, at a server, a request from a client device to visit a third-party content supplier in association with a redirection instruction;
identify, by the server and in response to the request, device information associated with the client device, location information associated with the client device, and a time of the request;
generate, by the server, a first time-dependent identifier for the client device using the device information, the location information, and the time of the request;
monitor, by the server, accesses to content provided by the third-party content supplier; and
associate, by the server, an access to a piece of content provided by the third-party content supplier with the request based on the first time-dependent identifier corresponding to a second time-dependent identifier associated with the access to the piece of content.

19. The system as recited in claim 18, further comprising:
truncating the time of the request; and
generating a valid time window for the first time dependent identifier based on the truncated request time.

20. The system as recited in claim 19, wherein truncating the request time further comprises:
removing at least one digit from an epoch time associated with the request;
dividing a remaining final digit of the epoch time by a predetermined number; and
rounding the final digit of the epoch time down to a closest integer.

* * * * *